W. C. KORTHALS-ALTES.
REPULSION MOTOR.
APPLICATION FILED FEB. 13, 1918.
1,396,582.
Patented Nov. 8, 1921.
Fig. 1.
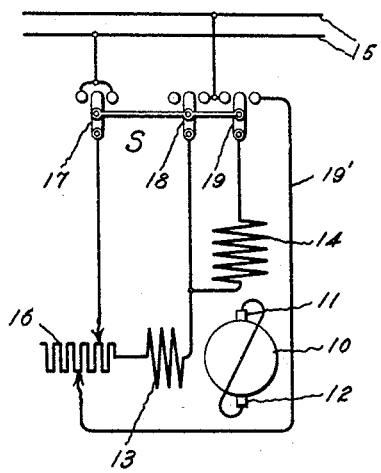
Fig. 2.
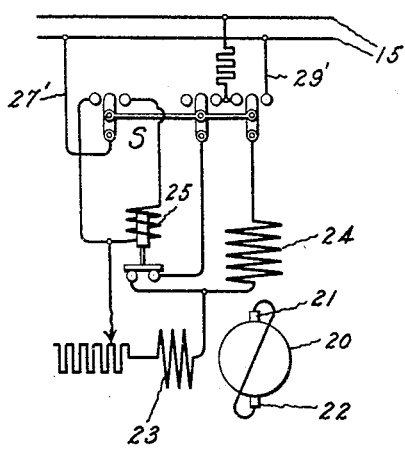
Fig. 3.
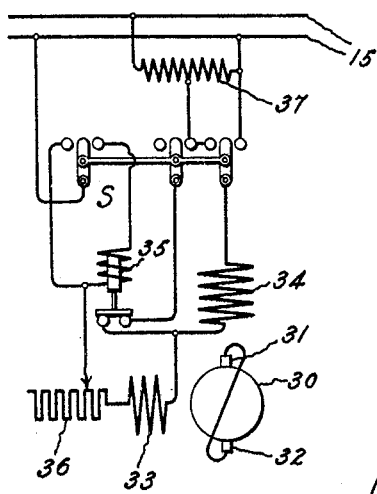
Fig. 4.
Fig. 5.
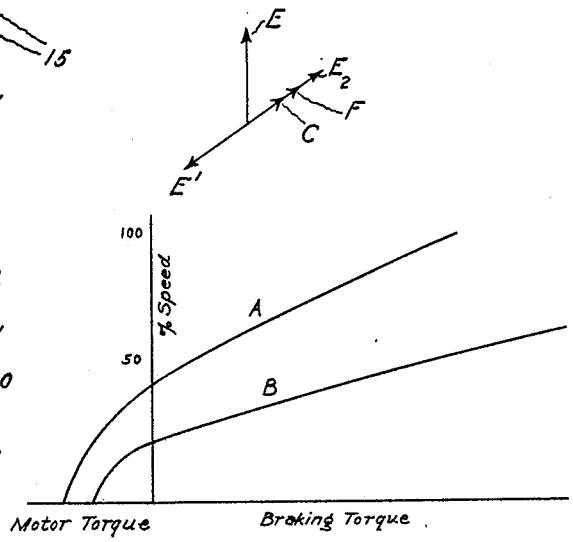
Inventor:
Willem C. Korthals-Altes,
by Albert G. Davis
His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

REPULSION-MOTOR.

1,396,582.  Specification of Letters Patent.  Patented Nov. 8, 1921.

Application filed February 13, 1918. Serial No. 216,949.

*To all whom it may concern:*

Be it known that I, WILLEM C. KORTHALS-ALTES, a subject of the Queen of the Netherlands, residing at Schenectady, in the county of Schenectady, State of New York, have invented certain new and useful Improvements in Repulsion-Motors, of which the following is a specification.

This invention relates to a method and means for controlling alternating current motors of a type generally known as repulsion motors, the object of this invention being to provide an improved control for starting, stopping and dynamically braking such a motor.

Heretofore it has been proposed to convert a repulsion motor into a braking generator by shifting the brushes through the neutral position, but such a mode of dynamically braking, throws objectionably violent strains upon the mechanical connections to the motor.

It has also been proposed to convert a repulsion motor into a braking generator by opening the line connections and then short-circuiting the stater winding in such a manner that induced current therein will furnish the desired counter or breaking torque, but such a system does not yield uniform results owing to its failure sometimes to self excite.

Still another mode of braking a repulsion motor has been proposed in which the rotor windings are provided with collector rings, to be short-circuited for operating the machine as an induction generator during the braking operation, but such a system only yields a braking action for speeds above synchronism.

In the practice of my invention I am able to secure a reliable and uniform braking action at speeds very much below synchronous speed, the breaking torque increasing with the speed, because I place the exciting component of the stator winding directly across the line with sufficient resistance in series to reduce the exciting current to a safe value, the remainder of the stator winding being connected in parallel with the exciting component. Such connections cause the motor to start with shunt characteristics but as soon as the speed exceeds a certain value an induced current will flow in a closed circuit through the stator windings which will yield a powerful braking action.

A repulsion motor equipped for dynamic braking in accordance with my invention may be used with advantage on cranes where the load is to be raised by the ordinary service operation of the motor but the lowering is to be controlled by the braking action.

For a more complete understanding of the nature and objects of this invention reference should be had to the following detailed description when taken in connection with the accompanying drawing; in which Figure 1 shows, in diagrammatic fashion, one arrangement of the connection for a repulsion motor embodying my invention. Fig. 2 shows a modified arrangement of the motor connections embodying my invention, and Fig. 3 shows still another modification. Fig. 4 is an explanatory vector diagram, while Fig. 5 shows characteristic curves for the braking operation.

Referring now to Fig. 1 of the drawing, the motor is represented as having a commutated rotor winding 10 provided with coöperating short-circuited brushes 11—12, and a stator winding having exciting and compensating components indicated at 13 and 14 respectively.

The stator windings are arranged to be connected across the single-phase supply mains 15 through a controlling switch here shown as the double throw switch S. The stator winding is also indicated as having an adjustable resistance 16 connected in series therewith for effecting speed-control during service operation of the motor.

The double throw switch S is arranged to connect the stator windings across the supply mains 15 in one position, here indicated as the left hand position, and in another, here shown as the right hand position, to connect the exciting winding 13 across the mains for insuring positive excitation during the braking operation and also to connect the compensating winding 14 in multiple therewith.

To this end the switch S is shown as provided with three blades 17, 18, 19; the blades 17 and 19 controlling the terminal connections of the stator winding while the third blade 18 controls an intermediate connection to the exciting winding 13, connecting it to a supply main and thereby establishing the multiple relation of the stator components, the compensating component having its polarity reversed during braking operation.

The operation of this form of my invention is as follows:

For normal service operation the switch S is moved to its left hand position. Current from the supply mains 15 then traverses the stator windings and the resistance 16 which are in series; the current producing a magnetic field whose axis is at an angle to the axis of the short-circuited brushes 11—12, causing the motor to operate as the ordinary repulsion motor.

For braking operation the switch S is subsequently moved to the right hand position which places the winding 13 across the mains 15 and the winding 14 in multiple with it, sufficient resistance at 16 being inserted in series with these windings to limit the current to a desired value. In this position of the switch S, the motor will start with shunt characteristics and develop a motor torque as indicated by the left hand portions of the full line curves A and B which were drawn for different values of the regulating resistance, shown in Fig. 5. As soon as the speed begins to build up, the motor torque decreases and a braking torque appears by reason of a current flowing in a short circuit through the stator windings by way of conductor 19′, which current is induced by the rotor current in a manner which will be more readily comprehended by reference to Fig. 4.

In this figure, the vector E denotes the impressed E. M. F. and C, the current from the mains 15 traversing resistance 16 and winding 13 and lagging by a certain angle behind the vector E. The current C will produce an exciting flux which will be substantially in phase therewith and is indicated by the vector F. The conductors of the rotor winding which are being revolved in the flux F will have an E. M. F. induced therein which is in phase with the flux F and is indicated by the vector $E^2$. This induced E. M. F. in the rotor denoted $E^2$ will cause a current to flow across the short-circuited brushes which current will induce an E. M. F. denoted E′ by transformer action, in the winding 14 which E. M. F. will be 180° out of phase with the E. M. F. denoted $E^2$. The E. M. F. $E^1$ will cause the counter or braking current to flow in the short circuit by way of conductor $19^1$ which current will be more or less out of phase with this E. M. F. due to the reactance in the circuit, and will assume a frequency dependent on the time constant of the circuit.

In Fig. 2 I have shown a modified arrangement of the motor connections in which the motor has a rotor winding 20 provided with coöperating short-circuited brushes 21—22, and an exciting winding 23, and compensating winding 24 for the stator. These stator windings are connected to the supply mains 15 by a switch S in substantially the same manner as that shown in Fig. 1, but I have placed a relay 25 under the control of the braking current flowing in the closed circuit through the stator windings for opening the intermediate connection from the winding 23 to the third blade of switch S when the braking current exceeds a certain value.

The mode of operation of this form of the invention is as follows: In the left hand position of the switch S, the motor runs in service operation as an ordinary repulsion motor. The switch S when subsequently moved to the right hand position will commence a braking operation, as soon as the motor reaches a certain speed, and an E. M. F. will be induced in the winding 24 causing a braking current to flow about a closed circuit by way of conductors 29′ and 27′. When this braking current exceeds a certain predetermined value, the relay 25 will operate to open the intermediate connection and thereby cut off the supply of electric energy from the line to the stator windings. While this relay is open, the motor will continue to exert a braking torque, but it now operates as a self excited generator without receiving external energy and while thus operating conserves the power supplied from the line.

In Fig. 3 I have shown an arrangement of the motor connections which are tapped into an auto-transformer or compensator. I have indicated the motor as comprising a rotor winding 30 having short-circuited brushes 31—32, and an exciting winding 33 and compensating winding 34 on the stator. The stator terminals are connected to the mains 15 by means of a three blade double throw switch S through a resistance 36 and an auto-tranformer 37. I have also shown a relay 35 placed so as to open the intermediate connection to the third blade of switch S when the counter or braking current exceeds a certain value.

The operation of this embodiment of my invention is substantially the same as that described in connection with the form shown in Fig. 2 except for the compensator feature which I have added and which functions in the well known manner to cut down the power consumption.

While I have here shown and described several embodiments of my invention and the method of practising the same which are at present the best means and method known to me for carrying the same into effect, I would have it understood that they are merely illustrative and that I do not mean to be limited to the precise details disclosed nor in the choice of recognized equivalents except as defined in my claims hereunto annexed.

What I claim as new and desire to secure by Letters Patent of the United States, is:

1. The method of dynamically braking a repulsion motor which consists in connecting the exciting component of the stator winding across the source of electrical supply, simultaneously reversing the polarity and connecting the remainder of the stator winding in multiple with the exciting component, and maintaining the magnitude of the induced stator current within predetermined limits during the braking period.

2. The method of dynamically braking a repulsion motor which consists in connecting the exciting component of the stator winding across the source of electrical supply, simultaneously reversing the polarity and connecting the remainder of the stator winding in multiple with the exciting component and opening the circuit including said exciting component when the induced current flowing in a closed circuit through said windings exceeds a predetermined value.

3. The combination with a repulsion motor having a stator winding comprising exciting and compensating components, of a controlling switch, connections controlled thereby to said winding whereby said switch in one position connects said winding across electrical supply mains and in another position connects only the exciting component across the supply mains, said switch having means for simultaneously reversing the polarity and connecting the balance of the stator windings in a circuit in multiple with said exciting component, and means in said multiple connected circuit for limiting the induced stator current.

4. The combination with a repulsion motor having a stator winding comprising exciting and compensating components, of a controlling switch, terminal connections to said winding and a connection to a point intermediate the components of said winding all controlled by said switch, whereby in one position thereof said winding is connected across electrical supply mains and in another position the exciting component only is connected across the supply mains, the balance of said winding being connected in multiple having its polarity reversed, and means introduced in the stator circuit when said switch is in the last-named position for limiting the induced stator current within predetermined values.

5. The combination with a repulsion motor having a stator winding comprising exciting and compensating components, of a controlling switch, terminal connections to said winding, a connection to a point intermediate the components of said winding and a normally open-circuited connection across said terminal connections, said switch being arranged to connect said terminal connections across electrical supply mains in one position, and in another to connect only said exciting component across the mains through said intermediate connection and to close said open-circuited connection, and means in said open-circuited connection for limiting the induced stator current within predetermined values.

6. The combination with a repulsion motor having a stator winding comprising exciting and compensating components, of a controlling switch, terminal connections to said winding, a connection to a point intermediate the components of said winding, a normally open-circuited connection across said terminal connections, and a relay under the control of current flowing in said open-circuited connection arranged to open said intermediate connection, said switch being arranged to connect said terminal connections across electrical supply mains in one position, and in another to connect said exciting component across the mains through said intermediatae connection and to close said open-circuited connection.

7. The combination with a repulsion motor having a stator winding comprising exciting and compensating components, of a controlling switch, terminal connections to said winding, a connection to a point intermediate the components of said winding, a normally open-circuited connection across said terminal connections, and automatic current regulating means connected in series with said open-circuited connection, said switch being arranged to connect said terminal connections across electrical supply mains in one position, and in another to connect said exciting component across the mains through said intermediate connection and to close said open-circuited connection.

8. The combination with a repulsion motor having a stator winding comprising exciting and compensating components, of a controlling switch, terminal connections to said winding, a connection to a point intermediate the components of said winding, a normally open-circuited connection across said terminal connections, current limiting means connected in series with said open-circuited connection, and a relay under the control of current flowing in said open-circuited connection arranged to actuate said current-limiting means, said switch being arranged to connect said terminal connections across electrical supply mains in one position, and in another to connect said exciting component across the mains through said intermediate connection and simultaneously to close said open-circuited connection.

In witness whereof, I have hereunto set my hand, this 11th day of February, 1918.

WILLEM C. KORTHALS-ALTES.